Inventor
Victor DUQUESNE
per: Linton and Linton
Attorneys

Oct. 4, 1966 V. DUQUESNE 3,276,504
TIRE DISMOUNTING APPARATUS OPERATED BY HYDRAULIC PRESSURE
Filed Jan. 23, 1964 2 Sheets-Sheet 2
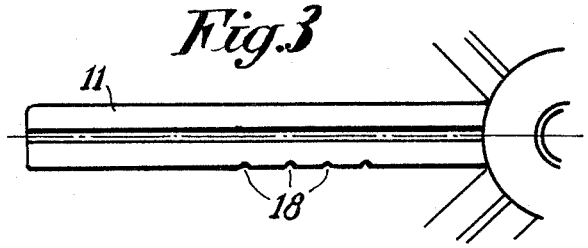
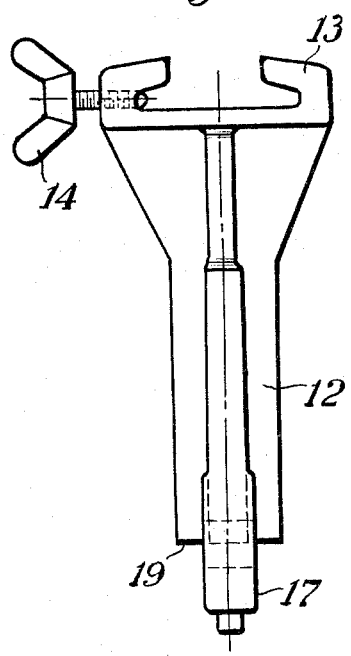
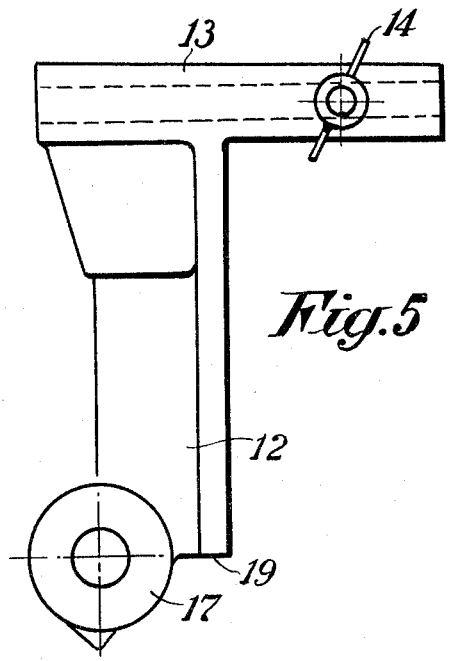
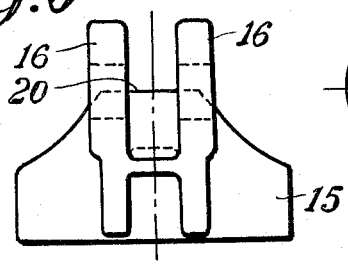
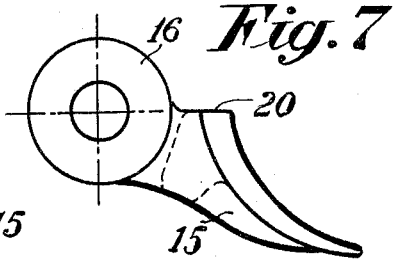
Inventor:
Victor DUQUESNE
per: Linton and Linton
Attorneys United States Patent Office 3,276,504
Patented Oct. 4, 1966

3,276,504
TIRE DISMOUNTING APPARATUS OPERATED BY HYDRAULIC PRESSURE
Victor Duquesne, 42–44 Rue Quellin, Antwerp, Belgium
Filed Jan. 23, 1964, Ser. No. 339,637
4 Claims. (Cl. 157—1.2)

The present invention is concerned with a tire dismounting apparatus automatically operated by hydraulic pressure.

The invention has for its principal object to provide an apparatus for removing a tire from a wheel rim by means of a spider device, having preferably eight arms, of which the arms are provided with claws of which the terminal spatula operates upon the tire bead without damaging the same and wherein the claw does not contact with the seat or bottom of the rim, while coming very close to the said seat or bottom, for removing the tire from the rim efficiently in one move.

According to the invention, the spider with spatulate claws is mounted in threaded engagement upon a threaded shaft driven by a hydraulic control cylinder with said shaft being removably connected to the piston rod of the hydraulic control cylinder.

The main characteristic of the invention consists in the fact that the claws, which are radially slidable upon the apparatus with relation to its axis, are initially locked upon the spider arms, at a fixed and rigid angle, in connection with adjusting marks formed upon the flanges of the spider arms, and at equal distances before any dismounting operation, said distances being determined by the dimension of the tire to be removed. Such distance is measured starting from the inner side of the claw body and it corresponds to the outer radius of the rim seat-increased with the axial clearance of approach of the pivoted spatula terminating the claws; said movement of approach is produced under the pressure of the main apparatus in function.

The claws which are slidable along the spider arms comprise a body portion having a median reinforcing rib, a spatula pivoted at one end of the body portion and a slide at the other end of the body portion, said slide sliding on the flanges of the spider arms. The spider arms are formed by inverted T-sections welded to a hub. A wing-screw is in threaded engagement with and through a fold of the slide at one side thereof and engages the adjusting marks provided at the corresponding edge of the spider arm. The pivoting movement of the claw spatula is angularly limited.

The apparatus according to the invention is further provided with a supporting column having a plate sustaining the wheel body in a centered position by known means in the art. The hydraulic control cylinder driving the apparatus comprises a cylinder of which the piston is alternately subjected to pressure on both sides, the piston rod being axially guided with respect to the supporting column of the apparatus. The piston rod is connected, preferably by threaded engagement, with the shaft engaging the spider provided with the claws. For the purpose of keeping the height of the apparatus within convenient limits, the hydraulic control cylinder is mounted in subfoundation with respect to the supporting column of the apparatus. The hydraulic control cylinder and the shaft bearing the spider are so operating in a common geometrical axis.

A form of embodiment of the apparatus according to the invention will be described by way of example with reference to the accompanying drawings.

FIGURE 3 is an enlarged plan view of portion of the spider and showing a spider arm provided with its adjusting marks.

FIGURE 4 is an enlarged front elevation of a claw according to the invention without its spatula.

FIGURE 5 is an enlarged side elevation of said claw without its spatulas.

FIGURE 6 is an enlarged front elevation of the claw spatula, and FIG. 7 is an enlarged side elevation of said claw spatula.

Figure 1:
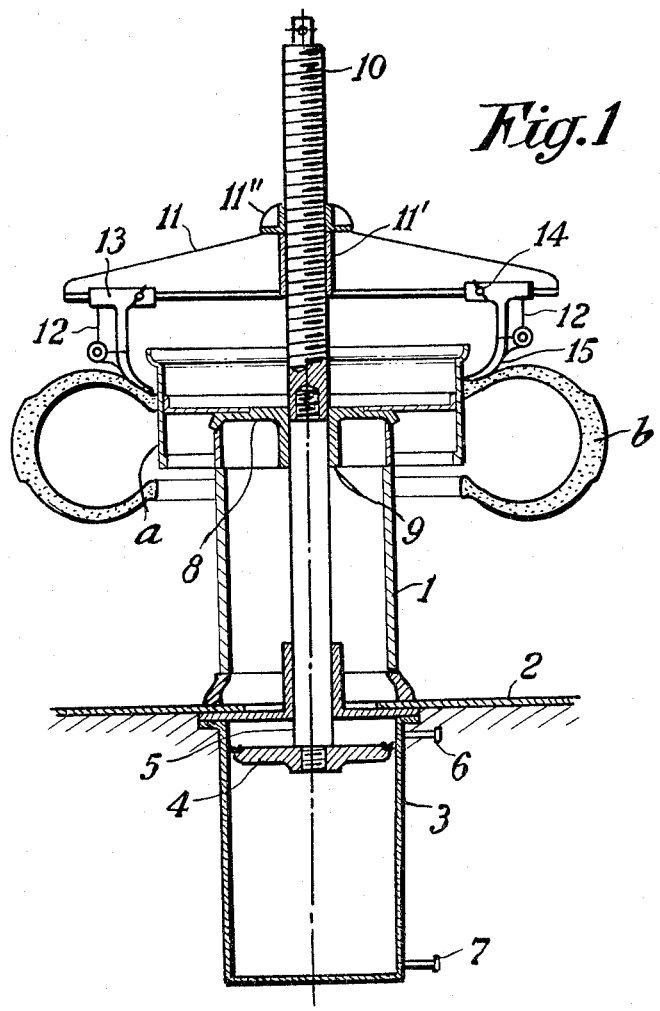
FIGURE 1 is a longitudinal cross-section view of the complete apparatus in vertical section.
Figure 2:
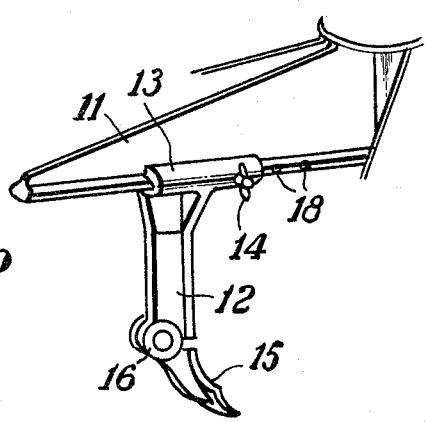
FIGURE 2 is a perspective view of an arm of the spider device provided with its adjustable claw.

The supporting column 1 is mounted upon a basement plate 2 and underneath the latter is fixed the hydraulic control cylinder formed by the cylinder 3, the piston 4 with its piston rod 5, a pipe 6 for the admission of hydraulic pressure for lowering the piston and a pipe 7 for the admission of hydraulic pressure to return the piston upwards. Pipes 6 and 7 are connected to conventional means, not shown, for supplying fluid under pressure thereto as required. The column 1 supports the sustaining plate 8 whose axial hub 9 forms a guide for the piston rod 5 and a threaded shaft 10 which is screwed endwise, on said piston rod and supports the spider 11 whose hub 11' is in threaded engagement with said shaft 10. A locking nut 11" is adapted to steady the position of the spider. The spider 11, preferably has eight arms each formed as an inverted T-section of which the web tapers towards the outer end and of which the horizontal flange supports a slidable claw 12.

FIGURES 4 to 7 illustrate the construction of one of said claws of which the body portion 12 is reinforced by a dorsal rib and has a slide 13 slidably embracing the flange of its spider arm. In a fold of the slide is located a wing-screw 14 adapated to penetrate within the inner plane of the slide. The other end of the claw body 12 is provided with a swinging spatula 15 of which the eyes 16 are pivoted upon a bracket 17 of the claw body. The angular pivoting movement of the spatula 15 is limited by shoulderings 19 and 20 provided respectively upon the claw body and the spatula. The slide 13 of the claw 12 is relatively prolonged towards the axis of the spider and the wing-screw 14 is adapted to engage the adjusting notches 18 of the horizontal flange of the spider arm 11. The adjusting marks 18 are made in functional relation with the dimension of the tire to be treated.

For dismounting a tire $b$ from the wheel rim $a$, the wheel body is laid centered upon the sustaining plate 8. The threaded shaft 10, which may be suspended in a known manner by counterweighted cable, is screwed by its tapped end upon the end of the piston rod 5 and the spider is lowered close towards the wheel body, the claws being adjusted within the notches 18 by the set screws 14 so as to rigidly fix said claws at right angles and of which the spatula enters freely in contact with the tire $b$. Upon admitting pressure within the pump 3–4 through the admission pipe 6, the spider is lowered pulling down the spatula fitted claws of which such spatula will swing inwardly until contact is made between the abutments 19 and 20. This swinging movement of the spatula causes the penetration of their edge behind the tire bead in contact with the same, but without such edge contacting the rim seat $b$. The stroke of the control cylinder piston 4 is dimensioned to make the tire slide down in one stride from the wheel rim. The admission of fluid under pressure by inlet pipe 7 causes the upward movement of the spider. The shaft 10 is now unscrewed from the piston rod 5, for the purpose of permitting the removal of the wheel body from the sustaining plate 8.

The main characteristic of the invention results in the automatic working of the apparatus, such effect being secured by the special claws which are slidable along the spider arms and adapted to be clamped thereon in a determined fixed position. Assuming for instance the most useful dimension of the tire to be dismounted which is that of 20 inches, the claws are locked in place each within the corresponding adjusting mark and the mere activation of the hydraulic pressure will result, without further surveyance, in bringing the claw spatula in contact with the tire and make them penetrate automatically under the wheel rim, whereby the spatula will take simultaneously a horizontal position upon the tire within a circular formation of exactly 20 inches. During the dismounting operation of the tire, the spatula makes no contact with the rim seat, so that any abrasion of this seat is avoided. The pivotal mounting of the spatula upon the claw body and its angular movement being limited by the abutments 19–20 secures a rigid position of the assembly of the spider and claws until the tire is completely removed.

I claim:

1. An apparatus for dismounting a tire from a wheel rim comprising a supporting column with a sustaining plate for the wheel body and having a central hub portion, a basement plate having said column mounted thereon and having a central hub portion, a threaded shaft, a spider device having a central hub in threaded engagement with said threaded shaft, said spider device having radial arms formed by inverted T-sections fixedly connected to said central hub, a plurality of claws, spatulas pivotally connected to said claws, slides connected to said claws and slideably embracing the flanges of said spider arms, adjusting marks provided at the edge of one flange of said spider arms, locking means provided upon the claw slides and adapted to engage said adjusting marks of the spider arms for the preadjustment of the position of said claws on said spider arms according to the size of the tire to be dismounted, means provided upon each claw body and spatula for limiting the inward swinging movement of the spatula relative to said claw body, a hydraulic control cylinder positioned underneath and coaxial with said column, said control cylinder having a cylinder, a reciprocating piston and pressure admission pipes for both sides of said piston, the piston rod of said control cylinder traversing and guided by the central hub portion of said basement plate of the column and having its free end guided in the central hub of said sustaining plate, said threaded shaft and said piston rod being detachably connected with each other within their guided portions engaging the hub of said sustaining plate and pressure supplying means for said control cylinder.

2. An apparatus for dismounting a tire as per claim 1, in which the adjusting marks on the spider arms are formed by notches therein and said locking means is a set screw carried by the claw slide.

3. An apparatus for dismounting a tire as per claim 1, in which the piston rod of said hydraulic control cylinder, said threaded shaft and the hub portions of said sustaining plate and of said basement plate have a common geometrical axis.

4. An apparatus for dismounting a tire as per claim 1, in which the hydraulic control cylinder is located in a sub-foundation with respect to said column and its basement plate.

References Cited by the Examiner

UNITED STATES PATENTS

| 2,455,580 | 12/1948 | Hewitt | 157—1.17 X |
| 2,495,118 | 1/1950 | McCollister | 157—1.2 |
| 2,655,984 | 10/1953 | Lowrey | 157—1.17 |
| 2,730,166 | 1/1965 | Davidson et al. | 157—1.2 |

GRANVILLE Y. CUSTER, JR., *Primary Examiner.*